(12) United States Patent
Kono et al.

(10) Patent No.: US 7,236,182 B2
(45) Date of Patent: Jun. 26, 2007

(54) IMAGE PROCESSING SYSTEM AND METHOD, AND COMPUTER-READABLE RECORDING MEDIUM

(75) Inventors: Sunao Kono, Tokyo-to (JP); Mamoru Ichikawa, Koganei (JP)

(73) Assignees: Pioneer Corporation, Tokyo-to (JP); Mamrou Ichikawa, Tokyo-to (JP)

(*) Notice: Subject to any disclaimer, the term of this patent is extended or adjusted under 35 U.S.C. 154(b) by 306 days.

(21) Appl. No.: 10/184,049

(22) Filed: Jun. 28, 2002

(65) Prior Publication Data

US 2003/0002057 A1    Jan. 2, 2003

(30) Foreign Application Priority Data

Jun. 28, 2001    (JP)    ............................ P2001-197307

(51) Int. Cl.
*G09G 5/00*    (2006.01)
(52) U.S. Cl. ...................................................... 345/629
(58) Field of Classification Search ......... 345/619–640
See application file for complete search history.

(56) References Cited

U.S. PATENT DOCUMENTS

| | | | | |
|---|---|---|---|---|
| 5,657,434 A | * | 8/1997 | Yamamoto et al. ......... | 345/684 |
| 6,137,498 A | * | 10/2000 | Silvers ........................ | 345/629 |
| 6,300,983 B1 | * | 10/2001 | Fels et al. ................... | 348/580 |
| 6,533,417 B1 | * | 3/2003 | Sain ............................ | 351/203 |
| 2001/0030695 A1 | * | 10/2001 | Prabhu et al. ............... | 348/232 |
| 2003/0058254 A1 | * | 3/2003 | Dworsky et al. ........... | 345/619 |
| 2004/0066970 A1 | * | 4/2004 | Matsugu ...................... | 382/217 |

OTHER PUBLICATIONS

Baker-Thomas, Stephanie. "Fun With PhotoImpact 4.2." 1999, East of the Sun Publishing, parts of chapters 4 and 6.*
"Mosaic Creator". Andrew Olej. Website, software documentation. From: ☐☐http://aolej.com/mosaic/pattut.htm.*
"Mosaic Creater". Andrew Olej. From Internet archive—see bottom of page, from ☐☐http://web.archive.org.*
PC Magazine website, showing date of availability of software. Noting "mosaic10.zip"☐☐http://shareware.pcmag.com/product.php[id]17115[cid]137[SiteID]pcmag.*

* cited by examiner

*Primary Examiner*—Mark Zimmerman
*Assistant Examiner*—Eric Woods
(74) *Attorney, Agent, or Firm*—Nixon & Vanderhye, PC

(57) ABSTRACT

An image processing apparatus sequentially extracts regions from a static image, as first images, and forms a second image in which each of the first images is repeated in an array. In addition, the static image and the second image are output from a computer to be displayed on an image display.

19 Claims, 5 Drawing Sheets

PATTERNED IMAGE IN WHICH ELEMENT 1a IS REPEATED

PATTERNED IMAGE IN WHICH ELEMENT 1b IS REPEATED

IMAGE PROCESSING SYSTEM AND METHOD, AND COMPUTER-READABLE RECORDING MEDIUM

BACKGROUND OF THE INVENTION

1. Field of the Invention

The present invention relates to an image processing apparatus and method for generating new images using static images.

2. Description of Related Art

A number of high-quality, large-screen displays are developed recently and used for applications, such as indoor and outdoor advertisements, etc. based on images, both dynamic and static. These displays, when installed at locations where many people gather, contribute to increasing the impact of advertising, etc. through display of various images.

Dynamic images for advertisement, etc., with their better eye-catching effect, would require no further editing to give viewers a certain degree of impact of advertising, etc. In contrast, static images alone are less attractive and thus would need to use some technique in order to improve eye-catching effect.

In one technique, a static image is combined with a separately prepared dynamic image. However, a dynamic image which is out of context with a static image would fail to call the viewers' attention to the static image. In addition, it is extremely difficult to create a dynamic image which is not boring and which matches with a static image. In other techniques, some ad phrases may be scrolled, for example. However, this wouldn't be able to produce an eye-catching effect.

SUMMARY OF THE INVENTION

The invention has been made in view of the above circumstances, and an object of the invention is, therefore, to provide an image processing apparatus and method, etc. capable of creating images which can arouse viewers' interest in static images and thus are highly eye-catching.

An image processing apparatus according to the invention is provided with: an extracting device for sequentially extracting regions from a static image, as first images; an image forming device for forming a second image in which each of the first images is repeated in an array; and an image outputting device for outputting the static image and the second image.

According to this invention, the static image and the second image, in which each of the first images sequentially extracted from the static image is repeated in an array, are output, hence arousing interest in the static image to provide a highly eye-catching image as a whole.

The image processing apparatus may also be provided with an image displaying device for displaying images output from the image outputting device. In this case, the image display device displays thereon the static image and the second image in which each of the first images is repeated in an array.

The image outputting device may also output both the static image and the second image simultaneously. In this case, the static image and the second image may be output to be displayed side by side, or to display the second image in a manner surrounding the static image.

The image outputting device may also output the images by switching between the static image and the second image.

The image processing apparatus may also be provided with an extracting method specifying device for specifying an extracting method used by the extracting device. In this case, the extracting method may be specified according to a command accepted by a command accepting device. In addition, it may also be arranged such that one can specify, for example, the size, shape, moving speed, etc. of each of the first images sequentially extracted from the static image using the extracting method specifying device.

The image processing apparatus may also be provided with an image forming method specifying device for specifying a method by which the image forming device forms the second image. In this case, an image forming method may be specified according to a command accepted by the command accepting device. In addition, it may also be arranged such that one can specify, for example, the direction, speed, etc. for shifting the second image using the image forming method specifying device.

The image processing apparatus may also be provided with an output method specifying device for specifying a method by which the image outputting device outputs the static image and the second image. In this case, it may be arranged such that one can specify a time period for displaying the images to be sequentially switched. The images to be sequentially switched include only the static image, only the second image, or appropriate combinations of the static image with the second image.

The image processing apparatus may also be provided with: a static image storage device for storing a plurality of static images; and a static image selecting device for selecting the static images for extraction by the extracting device, one at a time, from the plurality of static images stored in the static image storage device. In this case, the image corresponding to the selected static images includes only the static images, only the second images, and appropriate combinations of the static images with the second images.

Each first image, or each region extracted from the static image by the extracting device, may also move continuously. In this case, the second image in which each first image is repeated in an array also changes continuously, hence resulting in a substantially dynamic image that is sufficiently eye-catching.

The image processing apparatus may also be provided with an extracting region displaying device for displaying the extracting regions. In this case, one can become aware of how the second image is being formed, and this can make the image more interesting. In one technique for displaying each first image or each region extracted from the static image, a mark indicating the first image may be superimposed on the static image displayed on the image displaying device. For example, the mark may also be in the form of one or more lines surrounding the region to be extracted.

A method of processing an image of the invention is provided with the steps of: sequentially extracting regions from a static image, as first images; forming a second image in which each of the first images is repeated in an array; and outputting the static image and the second image formed by the image forming device.

According to this invention, the static image and the second image, in which each of the first images sequentially extracted from the static image is repeated in an array, are output, hence arousing interest in the static image to provide a highly eye-catching image as a whole.

A computer-readable recording medium of the invention has a program to be executed by a computer recorded therein, wherein the program is provided with: an extracting procedure for sequentially extracting regions from a static image, as first images; an image forming procedure for forming a second image in which each of the first images is repeated in an array; and an image outputting procedure for outputting the static image and the second image.

According to this invention, the static image and the second image, in which each of the first images sequentially extracted from the static image is repeated in an array, are output, hence arousing interest in the static image to provide a highly eye-catching image as a whole.

DETAILED DESCRIPTION OF THE PREFERRED EMBODIMENTS

Figure 1:
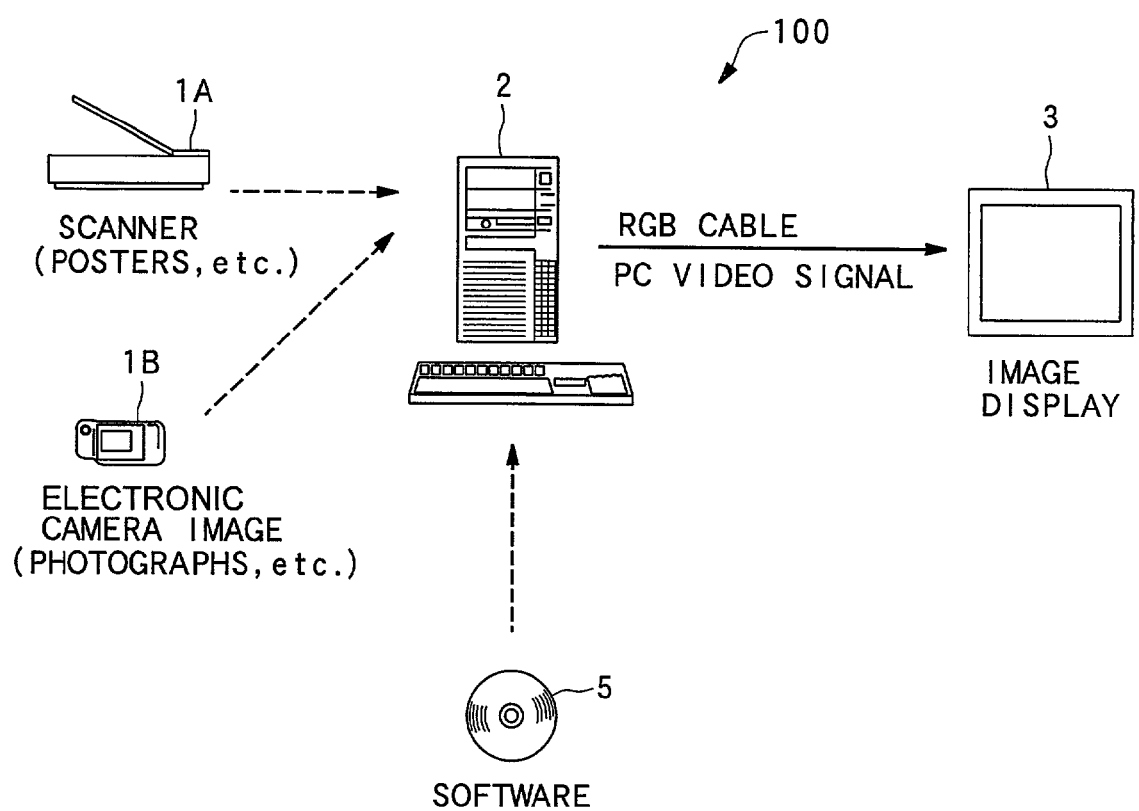
FIG. 1 is a diagram showing the configuration of an image processing apparatus according to an embodiment of the invention.

Referring now to FIG. 1, the configuration of an image processing apparatus according to an embodiment of the invention will be described. The image processing apparatus 100 is provided with a scanner 1A for capturing a static image from printed matter such as posters and photographs, an electronic camera 1B for capturing a photographed image (static image) and the like, a computer 2 for generating a predetermined image based on the captured static image, and an image display 3, connected to the computer 2, for displaying the generated image.

The computer 2 can be a personal computer (PC) or any other hardware capable of similar logic operation.

Although a large-screen display is preferable for enhanced effects, the image display 3 may be various types of displays including but not limited to personal computer displays, television displays compatible with NTSC, PAL and HDTV video specifications, CRTs, plasma displays, liquid-crystal panels, and other large-screen displays using LEDs and electric bulbs. In addition, a software recording medium 5 is not limited to a CD-shaped medium shown in the figure, but may be of any other forms.

The computer 2 may be connected to the image display 3 in a desired way, depending on the type of signal to be transmitted. For video signals, RGB cables may be used, and for digital video signals (digitally coded signals), other suitable cables may be used. These signals may also be transmitted wirelessly.

Figure 2:
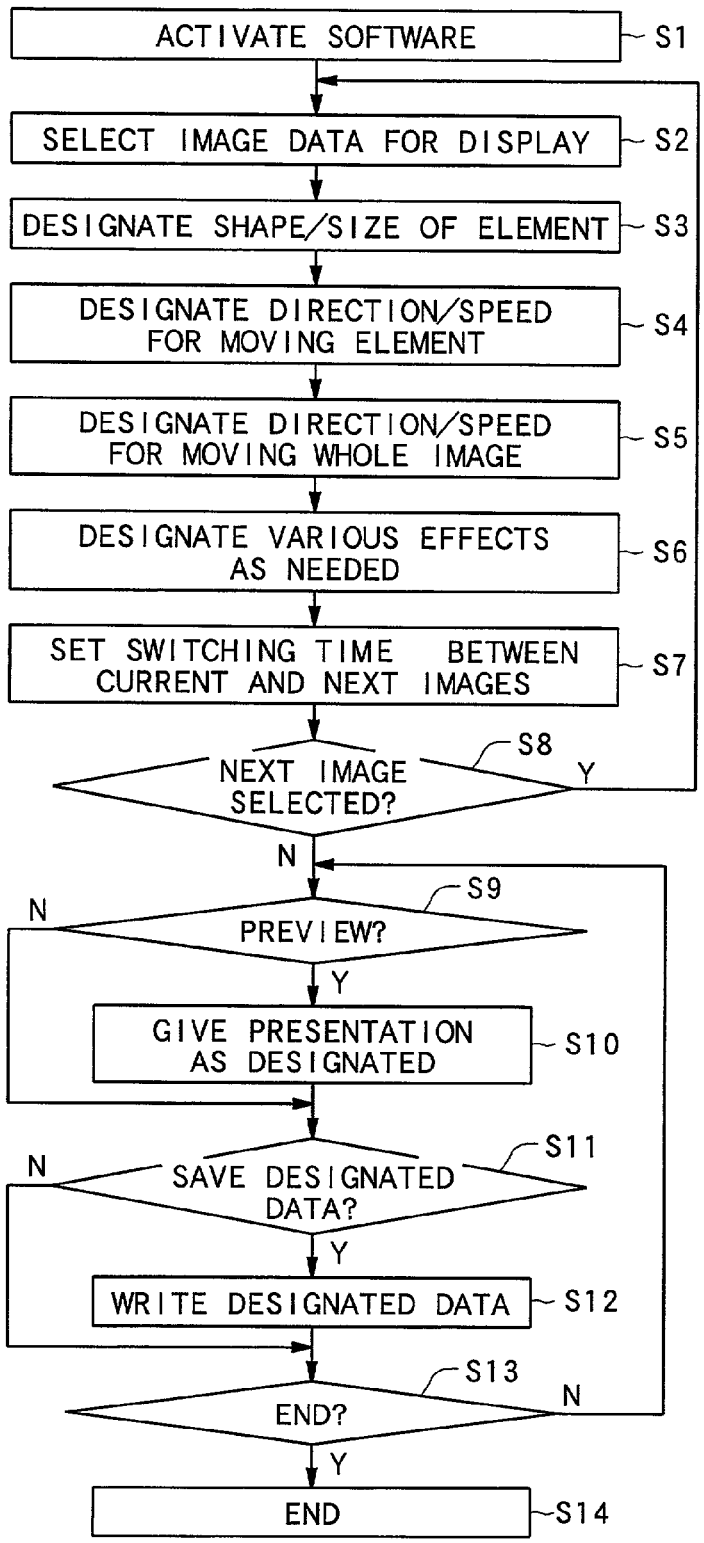
FIG. 2 is a flowchart showing a procedure for displaying an image.
Figure 2:
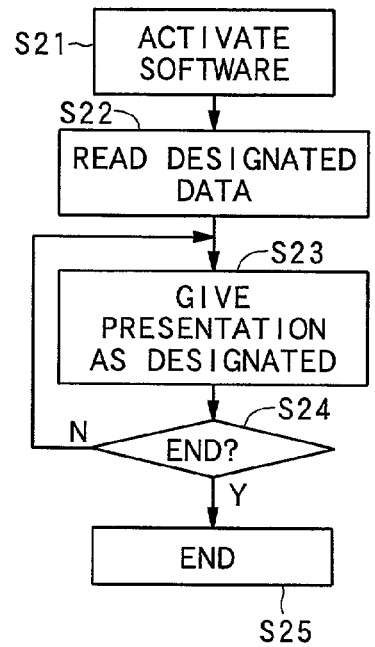
Figure 3:
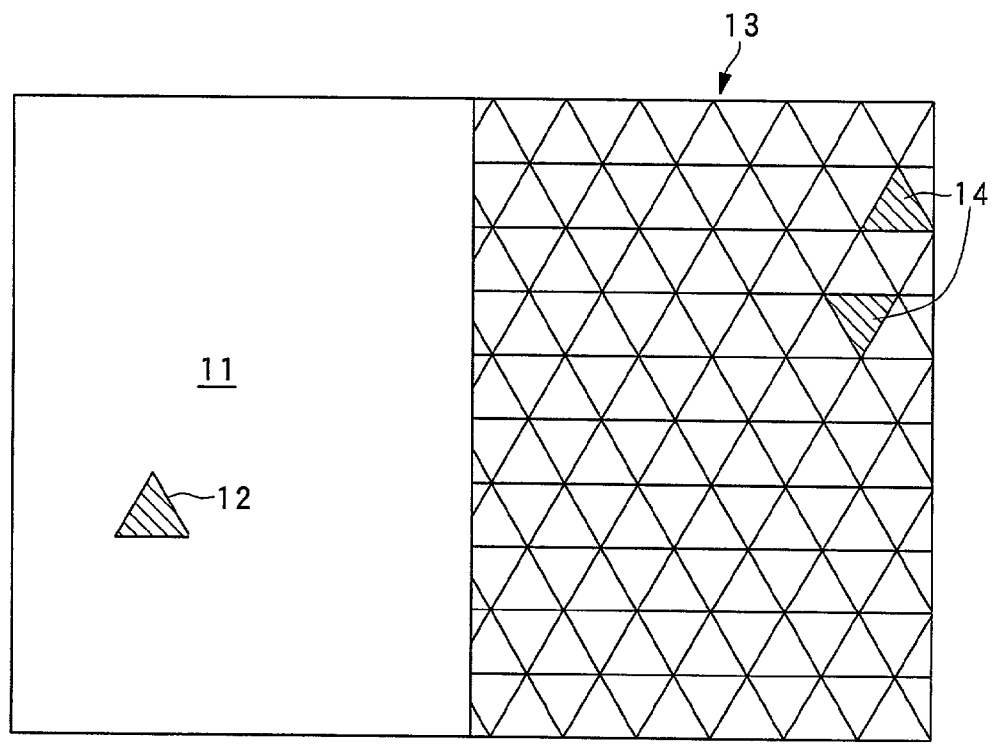
FIG. 3 is a diagram showing a displayed image.
Figure 4:
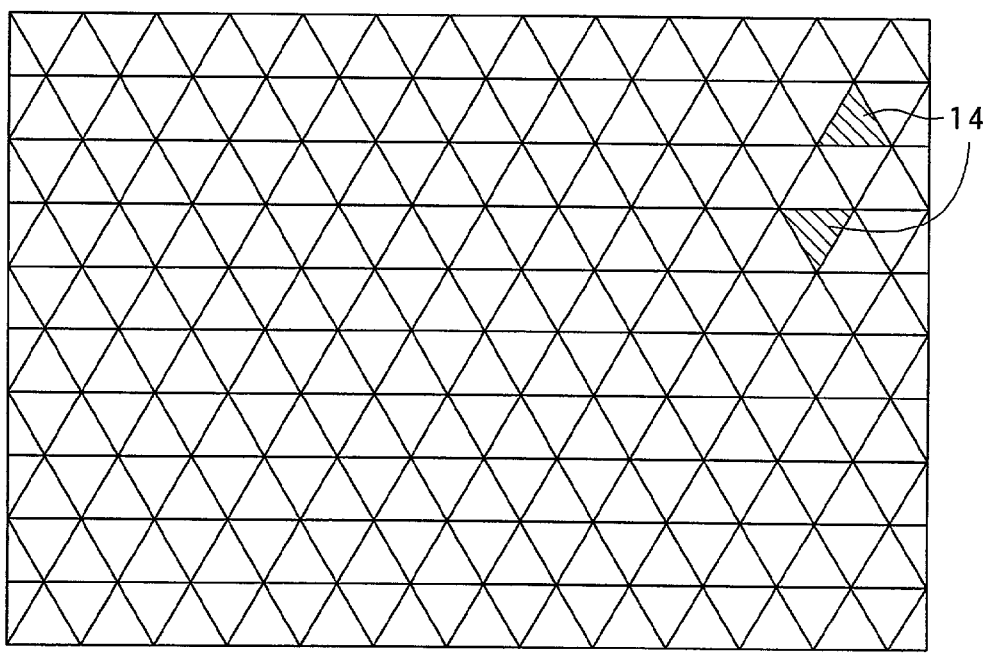
FIG. 4 is another diagram showing the displayed image.

Referring next to FIGS. 2 to 4, a procedure performed by the image processing apparatus 100 will be described in accordance with steps to be taken in order to display an image using a static image.

Referring first to FIGS. 3 and 4, the image to be displayed on the image display 3 will be described. In this embodiment, the processing apparatus 100 displays an image shown in FIG. 3 for a prescribed time period, after which it displays an image shown in FIG. 4.

In FIG. 3, a static image, which is an original image, is displayed in a left-side area 11, on which a triangular mark 12 indicative of a sampling element is superimposed. The mark 12 may be any region or closed shape linearly defined in the area 11, or may be displayed by changing the color, brightness, contrast, etc. of such a region or shape. Additionally, an element-repeated image, or otherwise referred to as a patterned image is displayed in a right-side area 13 of FIG. 3. The patterned image is made up of multiple unit images 14, each of which is the region indicated by the mark 12 as the sampling element. While the mark 12 makes continuous movement over the area 11, the image in which the unit image 14 or the region indicated by the mark 12 is repeated is displayed in the area 13 on a real-time basis.

The patterned image in the area 13 is formed of a pattern which is prepared, for example, by combining six (6) unit images 14 together, each unit image being oriented in one direction and rotated by 60 degrees relative to an adjacent unit image. How the patterned image in the area 13 is generated will be described in detail below. As the mark 12 moves over the static image, i.e., as the sampling element moves over the static image, each unit image 14 changes to constantly change the patterned image in the area 13. If the mark 12 (i.e., the sampling element) moves at some moderate speed, one can see the patterned image changing continuously, thus making the static patterned image substantially dynamic so as to be more eye-catching.

In one embodiment, the whole patterned image displayed in the area 13 may continuously shift in one direction, resulting in a dynamic image in which the patterned image is shifting in one direction with each unit image 14 changing therein. It may be arranged such that the shifting of the whole patterned image can be cancelled, or such that the shifting speed and direction can be selected.

As described above, although it is desirable to superimpose the mark 12 on the static image displayed on the image display 3, other ways may also be used to display a region or shape on the static image as a sampling element.

The image of FIG. 3 is switched to the image of FIG. 4 after being displayed for the prescribed time period. The image of FIG. 4, which is the same as that in the area 13 of FIG. 3, i.e., the patterned image composed of an array of the repeated unit images 14, appears on the entire screen. Although the static image itself is not displayed in the image of FIG. 4, the sampling element continuously moves over the hidden static image similarly to the display of FIG. 3.

Referring here to FIG. 2, the procedure for displaying an image will be described. In the procedure involving steps S1 to S14, an original static image is selected and data for defining a display method is designated, as to the image to be displayed.

First, in step S1, software is activated. Then, in step S2, the computer 2 accepts a command from an operator via an input device such as a keyboard, mouse, or touch panel, to select a static image, which is an original of the image to be displayed. In this step, the static image is captured to the computer 2 from the scanner 1A, electronic camera 1B or the like, and then a desired static image is selected from one or more static images stored in a memory within the computer 2 according to a command from the operator.

Next, in step S3, the shape and size of an element (sampling element) for sampling the static image selected in step S2 is designated according to a command from the operator. The orientation of the sampling element may also be designated. The shape of a sampling element is not limited to the triangle shown in FIGS. 3 and 4, but includes various shapes.

Figure 5:
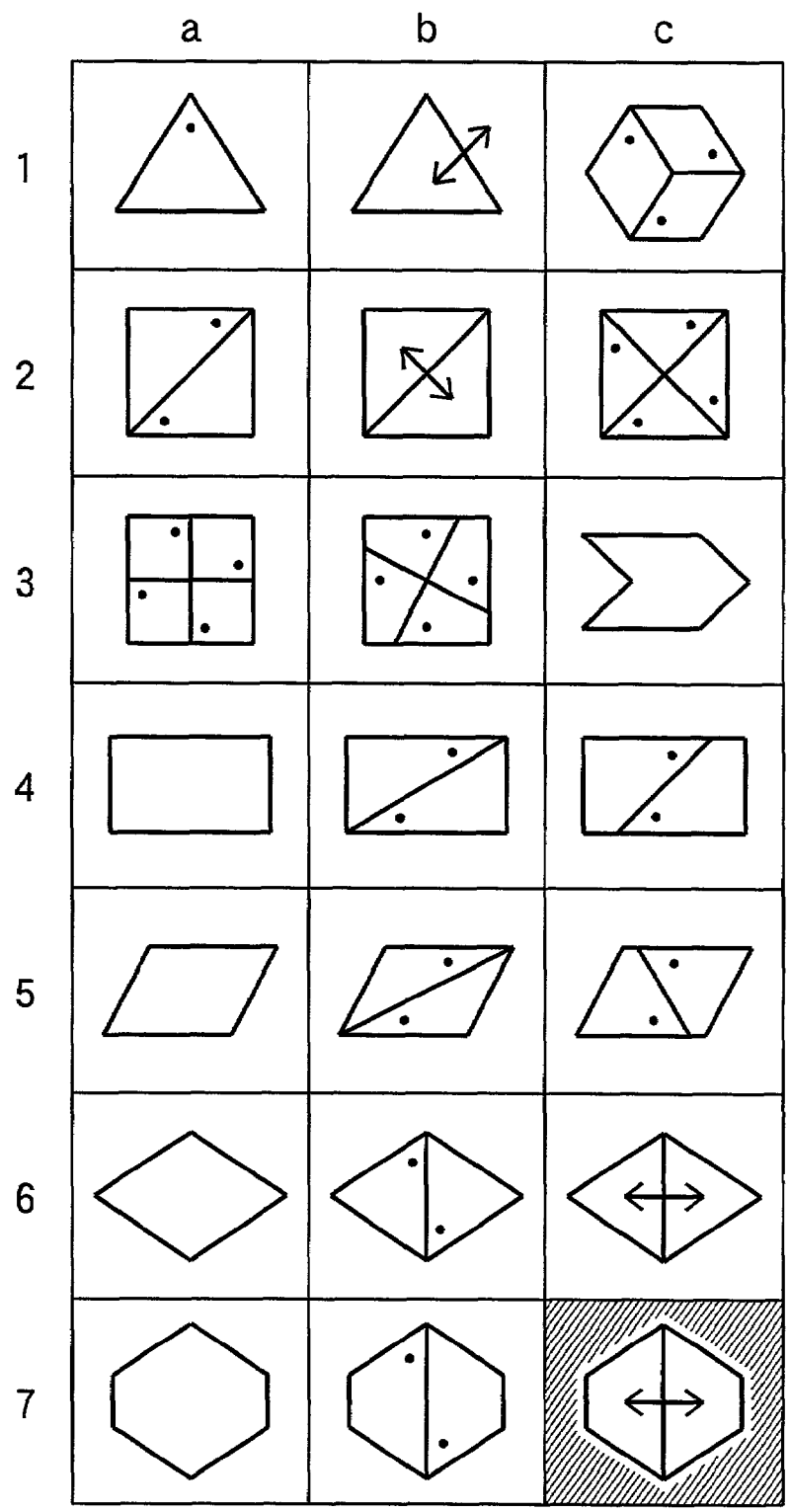
FIG. 5 is a diagram showing an example of a screen for selecting sampling elements.

FIG. 5 shows an example of a screen through which sampling elements can be selected. On this screen, the operator can select any of twenty-one (21) elements through a row (1–7) and column (a–c) designation. A selected element (an element 7*c* in FIG. 5) is highlighted.

Figure 6:
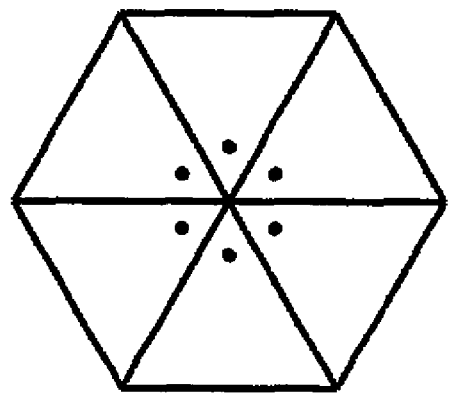
FIG. 6 is a diagram showing an example of an element-repeated image.

In FIG. 5, any element containing one or more dots (.) generates a pattern through rotation, and thus each dot indicates how adjacent elements are related to each other when rotated. For example, an element 1*a* forms an element-repeated image or a pattern such as shown in FIG. 6. Actually, a patterned image in which the hexagon shown in FIG. 6 is further repeated is generated.

Figure 7:
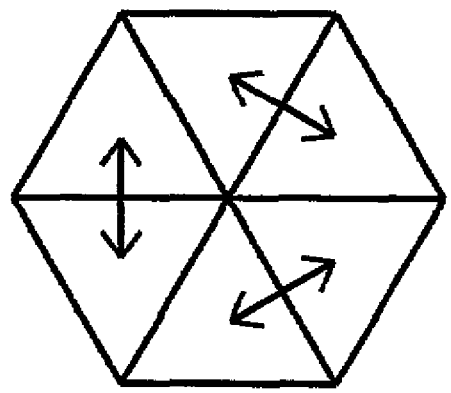
FIG. 7 is a diagram showing another example of an element-repeated image.

An element containing arrows (↑) is repeated in a manner forming a mirror image with its adjacent elements. For example, an element 1*b* repeats itself to form a pattern such as shown in FIG. 7. In this case also, a patterned image in which such a hexagon is further repeated is actually formed. This patterned image is identical with an image formed by a kaleidoscope using three mirrors.

A "composite element 2*a* or 3*b*" or a "pattern 2*a* or 3*b*," for example, is made up of two repeats (2*a*) or four repeats (3*b*) of a "basic" element displayed as a mark 12. Actually, such a composite element generates a patterned image in which the composite element or pattern is further repeated.

An element such as an element 4*a* or 6*a* containing neither dots nor arrows generates a patterned image in which the element is repeated only in one direction. In some embodiments, one may be able to opt to designate rotation and mirror-image formation for these basic elements.

An element 3*c* or 5*a* also repeats itself in one direction to generate a patterned image. An option to change the repeating direction for each column, for example, may be provided.

Images to be generated using the selection screen shown in FIG. 5 are exemplary element-repeated or patterned images. Other patterned images may also be generated, including an endless variety of kaleidoscopic patterns, and mirror image-based images which kaleidoscopes could not create but computers can create.

The shape of a sampling element is not limited to ones, each being repeated contiguously without space between adjacent elements or patterns. If space exists between the adjacent elements or patterns, the space may be filled up using a predetermined technique.

The shape of a sampling element may be input as a parameter that expresses the dimensions of its component line or lines and its orientation in terms of values. A sampling element corresponding to an input parameter may be displayed on a display (or the image display 3) connected to the computer 2 such that the real sampling element can be viewed on the screen for a check.

In step S4, the direction and speed for moving the sampling element over the static image are designated according to a command from the operator. The moving direction may be designated by entering both x- and y-axis coordinates. The moving speed may be designated in terms of the amount of movement per second or in terms of both the amount of movement and the frequency of movement (or time intervals), for example.

In step S5, the moving (shifting) direction and speed for the whole patterned image are designated according to a command from the operator. The moving direction may be designated by entering x-and y-axis coordinates.

In step S6, additional effects may be designated according to a command from the operator. These effects include but are not limited to addition of a border to each unit image 14 forming a patterned image and coloring the unit image 14 differently from the original static image, for example.

Then, in step S7, the display switching time is designated according to a command from the operator. For example, a display time period for the image of FIG. 3 or the image of FIG. 4 may be designated.

In step S8, it is determined whether or not the next static image will be selected according to a command from the operator. If so, control returns to step S2 to repeat steps S2 to S7 for the next static image. As a result, a chain of patterned images can be generated and displayed automatically for a plurality of static images. Otherwise, control proceeds to step S9.

In step S9, it is determined whether or not a request is made to preview the image generated in steps S2 to S7. If so, control proceeds to step S10 to display the generated video image on a display (or the image display 3) connected to the computer 2 under the designated conditions, after which control proceeds to step S11. If not, control proceeds to step S11.

In step S11, it is determined whether or not a request is made to save the data designated in steps S2 to S7 according to a command from the operator. If so, control proceeds to step S12 to save the designated data, after which it proceeds to step S13. If not, control proceeds to step S13.

In step S13, it is determined whether or not a request is made to terminate the data designation steps according to a command from the operator. If so, control proceeds to step S14 to terminate the data designation steps. If not, then control returns to step S9 to repeat steps S9 to S12.

In steps S21 to S25 shown in FIG. 2, the image is presented according to the designated data. In step S21, software is activated, and in step S22, the designated data is read. In step S23, the video image is displayed on the image display 3 as a presentation according to the data read in step S22. In step S24, it is determined whether or not a request is made to terminate the presentation, according to a command from the operator or based on information about how many times the presentation is to be given, for example. If the request is made, control proceeds to step S25 to terminate the procedure. Otherwise, control returns to step S23 to continue the presentation according to the designated data.

Any method may be used to combine static images together, patterned images generated based on the static images together, and a static image with a patterned image, and any display sequence may also be applied to the combined images. A static image and a patterned image may be displayed simultaneously as shown in FIG. 3, or a patterned image alone may be displayed as shown in FIG. 4. A plurality of static images may be displayed in various sequences.

Assuming that static images A1, A2, A3 . . . are prepared and that video images including their patterned images (each including only a patterned image, or both a patterned image and the static image) are B1, B2, B3 . . . , respectively, then they may be developed by switching in sequences such as (1) A1→B1→A2→B2→A3→B3 . . . , (2) A1→A2→A3 . . . , and (3) B1→B2→B3 . . . . The display sequence in which the image of FIG. 4 succeeds the image of FIG. 3 corresponds to that mentioned in (1) above.

According to the image processing system of the invention, an element-repeated or patterned image (dynamic image) is automatically generated on a real-time basis based on a static image. This prevents the user from separately preparing a dynamic image, and hence the amount of data prepared for displaying the image can be reduced. In addition, a patterned image is generated using an image extracted from a static image, and this permits the patterned image to get along well with the static image, and hence can arouse interest in the static image. Moreover, the patterned image looks very entertaining, and gives variegated changing patterns over the entire screen in linkage with changes in the position of a sampling element over the static image to add extremely high eye-catching effects to the generated image. Particularly, when a static image and a patterned image are displayed simultaneously and a sampling element extracted from the static image is also displayed on the screen as a mark, viewers can become aware of how the patterned image is being generated. This further increases the viewers' interest in the displayed image. The feature of the invention is not only to attract viewers' attention to a patterned image, but also to increase its eye-catching effects in relation to an original static image by effectively developing the static image. Therefore, the invention is particularly advantageous when applied to presentations in which one wishes to attract viewers' attention to a static image.

The entire disclosure of Japanese Patent Application No. 2001-197307 filed on Jun. 28, 2001 including the specification, claims, drawings and summary is incorporated herein by reference in its entirety.

What is claimed is:

1. An image processing apparatus comprising:
   an extracting device for extracting a portion of a static image, as a first image;
   an image forming device for forming a second image comprising a pattern in which the first image is repeated in two or more different orientations;
   an image outputting device for outputting to a display device the static image and the second image; and
   a changing device for automatically and dynamically changing a position of the portion extracted from the static image by the extracting device,
   wherein the image outputting device outputs both the static image and the second image simultaneously for display in respective display areas.

2. The image processing apparatus according to claim 1, further comprising the display.

3. The image processing apparatus according to claim 1, further comprising an extracting method specifying device for specifying an extracting method used by the extracting device.

4. The image processing apparatus according to claim 1, further comprising an image forming method specifying device for specifying a method by which the image forming device forms the second image.

5. The image processing apparatus according to claim 1, further comprising an output method specifying device for specifying a method by which the image outputting device outputs the static image and the second image.

6. The image processing apparatus according to claim 1, further comprising:
   a static image storage device for storing a plurality of static images; and
   a static image selecting device for selecting static images for extraction by the extracting device, one at a time, from the plurality of static images stored in the static image storage device.

7. The image processing apparatus according to claim 1, further comprising an extracting portion displaying device for displaying the extracted portions.

8. A computer-implemented method of processing an image comprising:
   (a) extracting a portion of a static image, as a first image;
   (b) forming a second image comprising a pattern in which the first image is repeated in two or more different orientations;
   (c) outputting to a display device the static image and the second image; and
   (d) automatically and dynamically repeating the extracting, forming and outputting for one or more other portions of the static image,
   wherein the outputting of the static image and the second image comprises outputting the static image and the second image simultaneously for display in respective display areas.

9. A computer-readable recording medium in which a program to be executed by a computer is tangibly embodied, the program causing the computer to function as:
   an extracting device for extracting a portion of a static image, as a first image;
   an image forming device for forming a second image comprising a pattern in which the first image is repeated in two or more different orientations;
   an image outputting device for outputting to a display device the static image and the second image formed by the image forming device; and
   a changing device for automatically and dynamically changing the position of the portion extracted from the static image by the extracting device,
   wherein the image outputting device outputs both the static image and the second image simultaneously for display in respective display areas.

10. A computer-implemented image processing method comprising:
    extracting an image portion from a static first image;
    forming a second image which comprises multiple copies of the extracted image portion, at least two of the copies being arranged at different orientations;
    outputting to a display device at least the second image; and
    automatically and dynamically repeating the extracting, forming and outputting for one or more other image portions from the first image,
    wherein the outputting of at least the second image for display comprises outputting the first image and the second image simultaneously for display in respective display areas.

11. The method according to claim 10, further comprising:
    selecting a size and a shape of the image portion.

12. The method according to claim 10, further comprising:
    shifting the second image.

13. The method according to claim 12, further comprising:
    selecting a speed and a direction of the shifting.

14. The method according to claim 10, further comprising:
    selecting the first image from among a plurality of different stored static images.

15. A computer-readable medium in which a program to be executed by a processing device is tangibly embodied, the program, when executed by the processing device, performing an image processing method according to claim 10.

16. An image processing device programmed to perform the image processing method according to claim 10.

17. An image display system comprising a display device and an image processing device according to claim 16.

18. The method according to claim 10, further comprising:
    displaying a mark on the first image which corresponds to the extracted image portion.

19. The method according to claim 18, further comprising:
    automatically and dynamically moving the mark in correspondence with the one or more other image portions.

* * * * *

UNITED STATES PATENT AND TRADEMARK OFFICE
CERTIFICATE OF CORRECTION

PATENT NO.        : 7,236,182 B2
APPLICATION NO. : 10/184049
DATED             : June 26, 2007
INVENTOR(S)       : Sunao Kono et al.

Page 1 of 1

It is certified that error appears in the above-identified patent and that said Letters Patent is hereby corrected as shown below:

On the Title Page, Item (73), delete "Mamrou Ichikawa" and insert --Mamoru Ichikawa-- therefor.

Signed and Sealed this

Twenty-first Day of October, 2008

JON W. DUDAS
*Director of the United States Patent and Trademark Office*